(12) United States Patent
Fan et al.

(10) Patent No.: US 12,130,451 B1
(45) Date of Patent: Oct. 29, 2024

(54) METHOD OF MULTI-ZONE GROUPED AND LIGHT-HOMOGENIZED FRESNEL LENS FOR CONCENTRATING SYSTEM

(71) Applicant: Xidian University, Xi'an (CN)

(72) Inventors: Guanheng Fan, Xi'an (CN); Baoyan Duan, Xi'an (CN); Yiqun Zhang, Xi'an (CN); Shimin Cao, Xi'an (CN); Kunpeng Liu, Xi'an (CN); Dongxu Wang, Xi'an (CN)

(73) Assignee: Xidian University, Xi'an (CN)

( * ) Notice: Subject to any disclaimer, the term of this patent is extended or adjusted under 35 U.S.C. 154(b) by 0 days.

(21) Appl. No.: 18/755,976

(22) Filed: Jun. 27, 2024

(30) Foreign Application Priority Data

Jun. 29, 2023 (CN) .......................... 202310788660.X

(51) Int. Cl.
*G02B 3/08* (2006.01)
*G02B 27/00* (2006.01)

(52) U.S. Cl.
CPC ........... *G02B 3/08* (2013.01); *G02B 27/0012* (2013.01)

(58) Field of Classification Search
CPC ........ G02B 3/08; G02B 3/02; G02B 27/0012; G02B 5/09; G02B 17/006; G02C 2202/20; G02C 2202/22; F21V 5/045; F24S 23/31; F24S 2023/872; F21S 11/002; B29D 11/00269; B29L 2011/005
USPC .......................... 359/742, 741, 743, 900, 708
See application file for complete search history.

(56) References Cited

U.S. PATENT DOCUMENTS

2003/0058532 A1* 3/2003 Suzuki ................. G03B 21/625
359/455

OTHER PUBLICATIONS

Pan et al., High concentration and homogenized Fresnel lens without secondary optics element, Optics Communications, vol. 284, Issue 19, 2011, pp. 4283-4288 (Year: 2011).*

(Continued)

*Primary Examiner* — Travis S Fissel
(74) *Attorney, Agent, or Firm* — Hemisphere Law, PLLC; Zhigang Ma

(57) ABSTRACT

A design method of a multi-zone grouped and light-homogenized Fresnel lens for a concentrating system includes: step 1, designing, according to a basic principle of a Fresnel lens, a planar Fresnel lens; step 2, establishing, according to an optical path characteristic of the concentrating system, an optical path equation of the concentrating system; step 3, determining a differential form of uniform distribution of luminous energy density; and step 4, based on the step 3, calculating design parameters of the multi-zone grouped and light-homogenized Fresnel lens to obtain the multi-zone grouped and light homogenized Fresnel lens. The obtained Fresnel lens can realize low-power concentrating, solve the problem that luminous energy is too concentrated under a high-power light-concentrating ratio, achieve high-uniformity design under different light-concentrating ratios, and improve the light-homogenized performance of the concentrating system, thereby solving non-uniform luminous energy density distribution on a surface of a photovoltaic cell.

1 Claim, 11 Drawing Sheets

(56) References Cited

OTHER PUBLICATIONS

CNIPA, Notification of First Office Action for CN202310788660.X, Dec. 23, 2023.
Xi'an University of Electronic Science and Technology (Applicant), Reply to Notification of First Office Action for CN202310788660.X, w/ (allowed) replacement claims, Dec. 28, 2023.
CNIPA, Notification to grant patent right for invention in CN202310788660.X, Feb. 1, 2024.

* cited by examiner

METHOD OF MULTI-ZONE GROUPED AND LIGHT-HOMOGENIZED FRESNEL LENS FOR CONCENTRATING SYSTEM

CROSS-REFERENCE TO RELATED APPLICATION

This application claims priority to a Chinese patent application No. 202310788660.X, filed to China National Intellectual Property Administration (CNIPA) on Jun. 29, 2023, which is herein incorporated by reference in its entirety.

TECHNICAL FIELD

The disclosure relates to the technical field of space solar power station (SSPS), particularly to a design method of a multi-zone grouped and light-homogenized Fresnel lens for a concentrating system.

BACKGROUND

With progress of society and development of economy, human demand for energy continues to grow. However, reserves of fossil fuels are limited and non-renewable. Therefore, a technology for generating an environmentally friendly, safe, and inexhaustible new energy source urgently needs to be developed. The SSPS emerges, which is a system for energy conversion and transmission that collects space solar energy and convert the space solar energy into electrical energy, converts the electrical energy into microwave energy through radio-frequency (RF) devices, radiates the microwave energy to designated positions on ground through transmitting antennas, and converts the microwave energy received into a direct current (DC) through receiving antennas on the ground. Due to a fact that collecting the solar energy in space is not affected by atmospheric attenuation, day night alternation, or geographical positions, the SSPS has advantages of stable, efficient, and large-scale collection and conversion of the solar energy. Therefore, the SSPS is one of the most promising ways to solve ground energy and is of great significance for research.

The SSPS is mainly divided into a concentrating design and a non-concentrating design. Due to characteristic advantages of modularization, higher concentration ratio, and higher power-to-mass ratio, schemes of the SSPS mostly adopt the concentrating design, such as an orb-shape membrane energy gathering array (OMEGA), an arbitrarily large phased array (ALPHA), etc. Specially, the OMEGA adopts a spherical concentrator, and the ALPHA adopts a goblet-shaped concentrator composed of a large number of reflectors. In addition to the reflective concentrating design, there is also a transmitted concentrating design. For example, IanCash from Britain developed a new solar power satellite (SPS) concept with a double-helix structure, i.e., CASSIOPeiA (referred to the SPS with a constant aperture, solid-state, integrated, orbital phased array), which adopts a Fresnel lens concentration mode. However, under the higher concentration ratio, there are problems of non-uniform luminous energy distribution, excessive local energy flow density, and excessively concentrated energy. Namely, the related content is disclosed in Cash I, CASSIOPeiA Solar power satellite[C], Proceedings of 2017 IEEE International Conference on Wireless for Space and Extreme Environments (WiSEE) Montreal, Canada, 10-12 Oct. 2017, pages: 144-149.

A photovoltaic conversion system is usually composed of a high-efficiency multi-junction gallium arsenide photovoltaic cell array. Although efficiency of the photovoltaic conversion system can reach 32%, an uneven distribution of energy density on a surface of the photovoltaic cell caused by the concentrating system can directly affect the photovoltaic conversion efficiency of the photovoltaic cell array, resulting in energy loss of the entire photovoltaic conversion system. Therefore, it is particularly important to design the concentrating system to ensure that the luminous energy is evenly distributed on the surface of the photovoltaic cell array.

SUMMARY

An objective of the present disclosure is to provide a design method of a multi-zone grouped and light-homogenized Fresnel lens for a concentrating system, which realizes a low-power concentrating design through the multi-zone grouped design, effectively improves the light-homogenized performance of the concentrating system, and solves the problem of non-uniform distribution of luminous energy density on an upper surface of a photovoltaic cell.

A technical solution adopted in the present disclosure is the design method of the multi-zone grouped and light-homogenized Fresnel lens for the concentrating system, which is specifically implemented according to the following steps: step 1, designing, according to a basic principle of a Fresnel lens, a planar Fresnel lens; step 2, establishing, according to an optical path characteristic of the concentrating system, an optical path equation of the concentrating system; step 3, determining a differential form of uniform distribution of luminous energy density; and step 4, based on the step 3, calculating design parameters of the multi-zone grouped and light-homogenized Fresnel lens to obtain the multi-zone grouped and light homogenized Fresnel lens.

The present disclosure further includes the following steps.

The step 1 specially includes the following steps: designing, according to widths of multiple zones of the planar Fresnel lens, the planar Fresnel lens including an equal-width-zone planar Fresnel lens and an equal-height-zone planar Fresnel lens.

The above step specially includes: designing the equal-width-zone planar Fresnel lens according to a formula expressed as follows:

$$n \sin \alpha_i = \sin\left[\alpha_i + \arctan \frac{i \cdot D}{F}\right].$$

In the above formula, D represents a zone width of the equal-width-zone planar Fresnel lens, F represents a focal length of the equal-width-zone planar Fresnel lens, n represents a refractive index of the equal-width-zone planar Fresnel lens, and $\alpha_i$ represents an inclination of an i-th zone of multiple zones of the equal-width-zone planar Fresnel lens; and generatrices of the equal-width-zone planar Fresnel lens are obtained according to the inclinations of the multiple zones of the equal-width-zone planar Fresnel lens.

The above step further includes: designing the equal-height-zone planar Fresnel lens according to a formula expressed as follows:

$$n \sin \alpha_i = \sin\left[\alpha_i + \arctan \frac{\frac{h}{\tan \alpha_i} + R_{i-1}}{F}\right].$$

In the above formula, h represents a zone height of the equal-height-zone planar Fresnel lens, and $\alpha_i$ represents an inclination of an i-th zone of multiple zones of the equal-height-zone planar Fresnel lens; when i=1, $R_{i-1}$ in the formula for the equal-height-zone planar Fresnel lens is equal to 0, which corresponds to a first zone of the multiple zones of the equal-height-zone planar Fresnel lens; when i>1, $R_{i-1}$ in the formula for the equal-height-zone planar Fresnel lens is not equal to 0, which corresponds to an outer zone of the multiple zones of the equal-height-zone planar Fresnel lens; and when $R_i \geq R$, R represents a radius of the equal-height-zone planar Fresnel lens, an excess portion exceeding the radius R of the equal-height-zone planar Fresnel lens is removed to complete designing the equal-height-zone planar Fresnel lens.

The step 2 specially includes the following steps:
assuming that: an equation of a generatrix of the planar Fresnel lens at a zone of the multiple zones of the planar Fresnel lens is z=f(x), a range of the zone is [$x_{min}$, $x_{max}$], a distance from a plane to the planar Fresnel lens is $h_f=f(x_{max})$, an incident light perpendicular to an incident plane of the planar Fresnel lens is irradiated at $x=x_1$, the incident light is refracted at a point ($x_1$, $f(x_1)$) to generate a refracted light, an incident angle and a refraction angle of the incident light are respectively $\theta_1$ and $\theta_1'$, a unit vector of the incident light and a unit vector of the refracted light are respectively a vector $i_1$ and a vector r1, a unit vector at an intersection between the incident light and the generatrix of the planar Fresnel lens is $n_1$, and a refractive index of the planar Fresnel lens is n;

determining the incident angle of the incident light according to a formula expressed as follows:

$$\theta_1 = \arccos\left(\frac{1}{\sqrt{1+[f'(x_1)]^2}}\right);$$

determining the refraction angle of the incident light according to a law of refraction, based on a formula expressed as follows:

$\theta_1'=\arcsin(n \sin \theta_1)$;

determining a function between an abscissa $x_1$ of the incident light perpendicular to the incident plane of the planar Fresnel lens and an abscissa $x_2$ of an intersection of the refracted light with the plane with the distance $h_f$ from the planar Fresnel lens, as the optical path equation of the concentrating system, according to a formula expressed as follows:

$$x_2 = -\frac{f(x_1)(1+\cos^2\theta_1'[1+f'^2(x_1)])}{f'(x_1)-\cos\theta_1'\sin\theta_1'[1+f'^2(x_1)]} + x_1.$$

In the above formula, a center of the planar Fresnel lens is a coordinate zero point, a refracted optical path of the planar Fresnel lens on a negative x-axis is axisymmetric with a refracted optical path of the planar Fresnel lens on a positive x-axis.

The step 3 specially includes the following steps.

Step 3.1, a first differential form of the uniform distribution of the luminous energy density is determined in a two-dimensional case.

Step 3.2, a second differential form of the uniform distribution of the luminous energy density is determined in a three-dimensional case as the differential form of uniform distribution of luminous energy density.

The step 3.1 specially includes the following steps: determining that an upper surface of a photovoltaic cell is disposed on a focal plane of the planar Fresnel lens, performing differential analysis on a center section of the planar Fresnel lens to establish a coordinate system of the center section of the planar Fresnel lens, where a thickness of the photovoltaic cell is $t_c$, a radius of the photovoltaic cell is r, and an infinitesimal taken from the zone of the plurality of zones of the planar Fresnel lens is $dx_1$; determining a luminous energy density of the incident light perpendicular to the incident plane of the planar Fresnel lens at the infinitesimal $dx_1$ as $I_0$, determining a curved-surface infinitesimal corresponding to the incident light on the generatrix of the planar Fresnel lens as $dl_1$, determining a luminous energy density at the curved-surface infinitesimal $dl_1$ as $I_1$, determining an infinitesimal of the incident light refracted at the upper surface of the photovoltaic cell as $dx_2$, determining a luminous energy density at the infinitesimal $dx_2$ as $I(x_2)$; and in a situation that a loss of luminous energy caused by the planar Fresnel lens is not considered, determining a two-dimensional luminous energy density of the upper surface of the photovoltaic cell under concentrating by the zone of the plurality of zones of the planar Fresnel lens according to a formula expressed as follows:

$$I(x_2) = \frac{I_0 dx_1}{dx_2} = I_0 \frac{1}{1+\frac{-k_r f'(x_1)+f(x_1)k_r'}{k_r^2}}.$$

In the above formula, $k_r$ represents a gradient of the refracted light, and $k_r'$ represents a first derivative of the gradient of the refracted light.

The step 3.2 specially includes the following steps: obtaining, based on the two-dimensional luminous energy density, the uniform distribution of the luminous energy density in the three-dimensional case according to a formula expressed as follows:

$$I(x_2) = \frac{I_0 x_1 dx_1}{x_2 dx_2} = I_0 \frac{x_1}{x_2} \frac{1}{1+\frac{-k_r(x_1)f'(x_1)+f(x_1)k_r'(x_1)}{k_r^2(x_1)}}.$$

The step 4 specially includes the following steps.

Step 4.1 includes: designing a first group of zones of the planar Fresnel lens under the uniform distribution of the luminous energy density.

Step 4.2 includes: designing multiple groups of zones, and calculating zone inclinations, zone widths, and zone heights of the multiple groups of zones.

Step 4.3 includes: calculating a height error of each zone of the planar Fresnel lens, and calculating a zone height of each zone of the planar Fresnel lens after the height error is added.

Step 4.4 includes: obtaining the designed multi-zone grouped and light-homogenized Fresnel lens according to the design parameters of the planar Fresnel lens obtained in the step 4.1 to the step 4.3.

The step 4.1 specially includes the following steps.

A generatrix of a first zone of the first group of zones is designed as a plane with an inclination $\alpha_1=0$, and $R_1=r_1=d_1=D_1$ is determined.

Specially, a first zone width of the first zone of the first group of zones is $D_1$; a second zone width of a second zone of the first group of zones is $D_2$; a radius of the first zone of the first group of zones is $R_1$; and a radius of the second zone of the first group of zones is $R_2$.

Moreover, $d_1$ represents a width of a luminous region of the first zone caused by the refracted light on the upper surface of the photovoltaic cell; and $r_1$ represents a radius of the luminous region of the first zone caused by the refracted light on the upper surface of the photovoltaic cell.

The second zone width $D_2$ of the second zone of the first group of zones is determined according to a formula expressed as follows:

$$D_2 = R_2 - R_1.$$

An inclination $\alpha_2$ of the second zone of the first group of zones is determined according to a formula as follows:

$$n \sin \alpha_2 = \sin\left[\alpha_2 + \arctan \frac{R_2 - r_1}{F}\right].$$

A width $d_2$ of a luminous region caused by the refracted light on the upper surface of the photovoltaic cell is determined according to a formula expressed as follows:

$$d_2 = D_2 - \frac{R_2 - r_1}{F} D_2 \tan \alpha_2.$$

The step 4.2 specially includes the following steps: determining a generatrix equation of the planar Fresnel lens according to a formula expressed as follows:

$$z = f_i(x) = k_i(x - R_i) + h_i, x \in [R_{i-1}, R_i].$$

In the above formula, $k_i$ represents a gradient of an $i^{th}$ zone of the multiple groups of zones, $R_{i-1}$ and $R_i$ represent radii of the $i^{th}$ zone and an $(i-1)^{th}$ zone respectively; and $k_i = \tan \alpha_i$, where $\alpha_i$ represents the inclination of the $i^{th}$ zone of the multiple groups of zones.

A zone number in each group of the multiple groups of zones is m, and a group number of the multiple groups of zones is j, $j \geq 2$, j represents a $j^{th}$ group of zones.

Moreover, the step 4.2 further includes: determining the design parameters of a first zone in the $j^{th}$ group of zones of the multiple groups of zones.

Specially, a zone width of the first zone in the $j^{th}$ group of zones is determined according to a formula expressed as follows:

$$D_{mj-m+1} = D.$$

A zone inclination of the first zone in the $j^{th}$ group of zones is determined according to a formula expressed as follows:

$$n \sin \alpha_{mj-m+1} = \sin\left[\alpha_{mj-m+1} + \arctan \frac{R_{mj-m+1} - r_{mj-m+1} + D_{mj-m+1} + \frac{D_{mj-m+1}(R_{mj-m+1} - r_{mj-2m+1} + D_{mj-m+1})}{F - D_{mj-m+1}\tan \alpha_{mj-m+1}}}{F}\right].$$

A zone height of the first zone in the $j^{th}$ group of zones is determined according to a formula expressed as follows:

$$h_i = D \tan \alpha_i.$$

In addition, the design parameters of an $i^{th}$ zone in the $j^{th}$ group of zones of the multiple groups of zones are determined.

A zone width of the $i^{th}$ zone in the $j^{th}$ group of zones is determined according to a formula expressed as follows:

$$D_{mj-m+i} = \frac{\sqrt{cr \cdot (r_{mj-m+1}^2 - r_{mj-2m+1}^2) + R_{mj}^2} - R_{mj-m+1}}{m-1}.$$

A zone inclination of the $i^{th}$ zone in the $j^{th}$ group of zones is determined according to a formula expressed as follows:

$$n \sin \alpha_{mj-m+i} = \sin\left[\alpha_{mj-m+i} + \arctan \frac{R_{mj-m+i} - r_{mj-m+i}}{F}\right].$$

A zone height of the $i^{th}$ zone in the $j^{th}$ group of zones is determined according to a formula expressed as follows:

$$h_i = D \tan \alpha_i, i \in [2, m].$$

The step 4.3 specially includes the following steps: performing a theoretical calculation on a zone height $h_m$ of a group of zones of the planar Fresnel lens after the zone height $h_m$ of the group of zones of the planar Fresnel lens is added with the height error $\Delta h_m$ of the group of zones of the planar Fresnel lens, where m represents a $m^{th}$ zone of the group of zones of the planar Fresnel lens, and the zone height $h_m$ of the group of zones of the planar Fresnel lens satisfied with a normal distribution is added according to the following formula:

$$\Delta h_m = \frac{1}{\sqrt{2\pi}} \exp\left(-\frac{(X-\mu)^2}{2\sigma^2}\right).$$

Then the zone height $h_m$ of the group of zones of the planar Fresnel lens is obtained as follows:

$$h_m' = h_m - \Delta h_m.$$

The beneficial effects of the present disclosure are as follows.

1. The present disclosure provides the design method of the multi-zone grouped and light-homogenized Fresnel lens for the concentrating system, which uses the multi-zone grouped design to realize the low-power condensation, so that the distribution of the luminous energy on the upper surface of the photovoltaic cell is uniform, and the problem that the luminous energy at a focal point is too condensed due to the high light-concentrating of the original Fresnel lens is solved.

2. The design method of the multi-zone grouped and light-homogenized Fresnel lens for the concentrating system provided by the present disclosure realizes high-efficiency luminous energy collection under different light-concentrating ratios through the multi-zone grouped and light-homogenized design.

3. The design method of the multi-zone grouped and light-homogenized Fresnel lens for the concentrating system provided by the present disclosure utilizes designs in the heights and widths of the different zones, thereby effectively improving the light-homogenized performance of the concentrating system, and solving the problem of non-uniform distribution of the luminous energy density on the upper surface of the photovoltaic cell.

DETAILED DESCRIPTION OF EMBODIMENTS

The disclosure will be further described in detail below with reference to illustrated embodiments, but implementations of the disclosure are not limited thereto.

Figure 1:
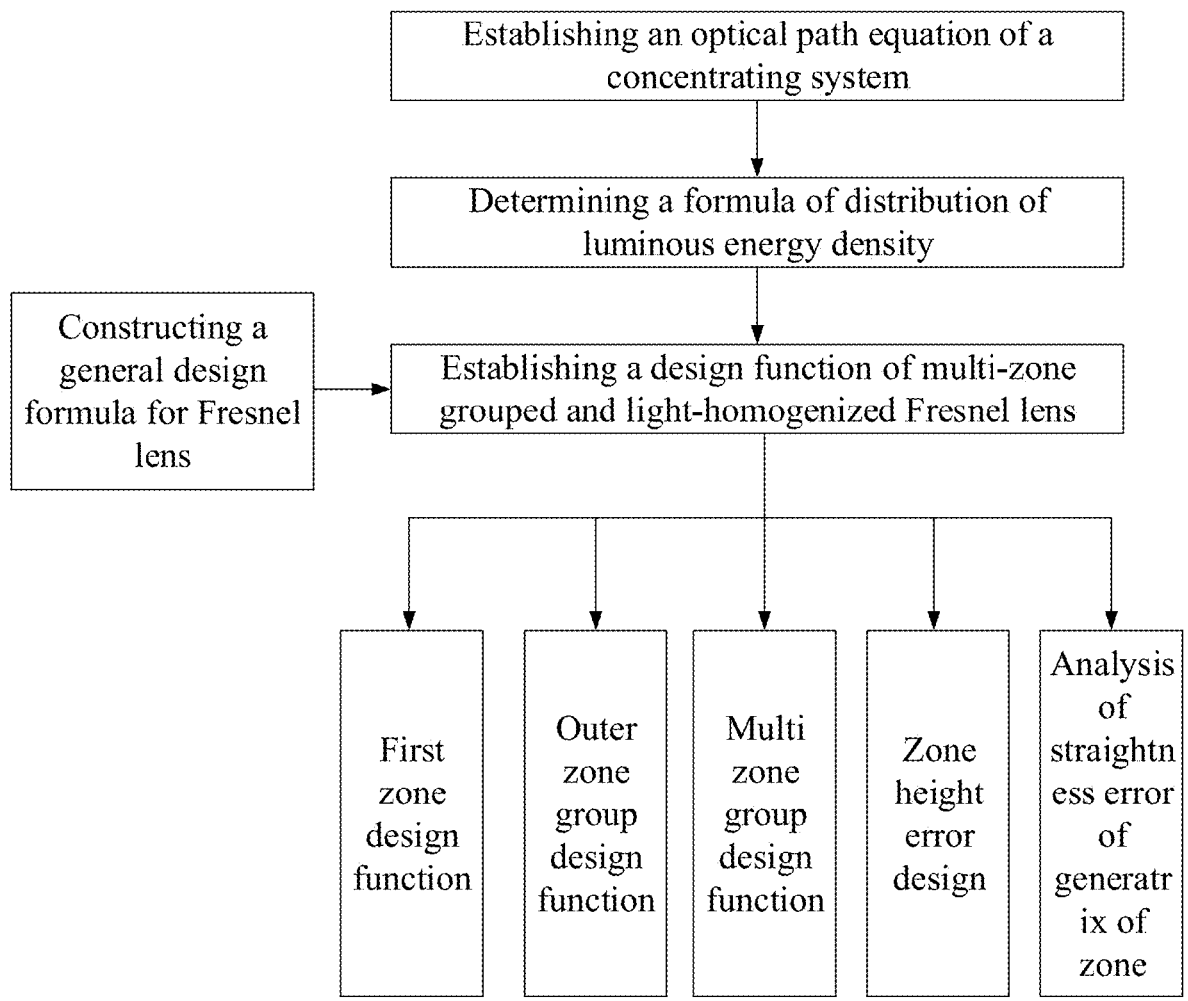
FIG. 1 illustrates a flow chart of a design method of a multi-zone grouped and light-homogenized Fresnel lens for a concentrating system according to the present disclosure.

As shown in FIG. 1, the present disclosure is specifically implemented according to the following steps.

Step 1: according to a basic principle of a Fresnel lens, a planar Fresnel lens is designed.

Figure 2:
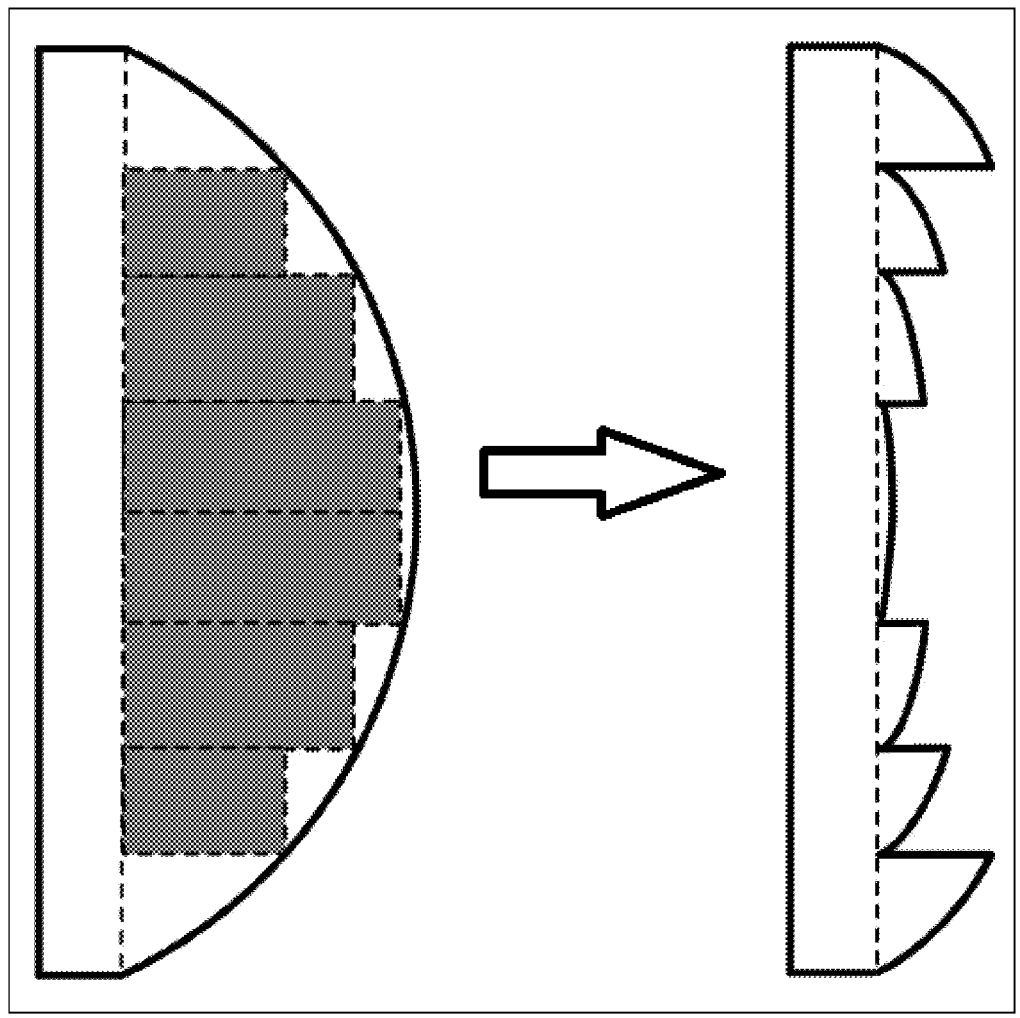
FIG. 2 illustrates a schematic diagram of a basic principle of a Fresnel lens.

The Fresnel lens evolves from a convex lens that preserves an optical surface undergoing refraction and removes excess material as much as possible. As shown in FIG. 2, a left side of FIG. 2 is a central cross-sectional view of the initial convex lens, and shaded portions illustrated thereon are redundant optical materials to be removed, and a right side of FIG. 2 is a central cross-sectional view of the curved Fresnel lens after the redundant optical materials are removed.

Figure 3:
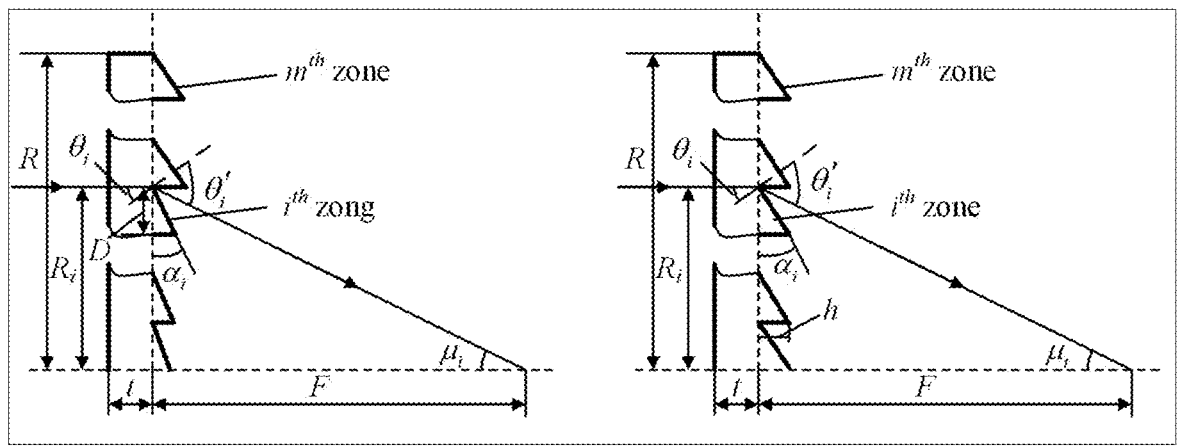
FIG. 3 illustrates a schematic diagram of a design principle of a planar Fresnel lens.

According to widths of different zones, the designing planar Fresnel lens includes: an equal-width-zone planar Fresnel lens and an equal-height-zone planar Fresnel lens. As shown in FIG. 3, a left side thereof is the equal-width-zone planar Fresnel lens, and a right side thereof is the equal-height-zone planar Fresnel lens.

A formula of the equal-width-zone planar Fresnel lens is as follows:

$$n \sin \alpha_i = \sin\left[\alpha_i + \arctan\frac{i \cdot D}{F}\right].$$

In the above formula, D represents a zone width of the equal-width-zone planar Fresnel lens, F represents a focal length of the equal-width-zone planar Fresnel lens, a radius of the planar Fresnel lens is R, n represents a refractive index of the equal-width-zone planar Fresnel lens, and $\alpha_i$ represents an inclination of an i-th zone of multiple zones of the equal-width-zone planar Fresnel lens; and generatrices of the equal-width-zone planar Fresnel lens are obtained according to the inclinations of the multiple zones of the equal-width-zone planar Fresnel lens.

A formula of the equal-height-zone planar Fresnel lens is as follows:

$$n \sin \alpha_1 = \sin\left[\alpha_i + \arctan\frac{\frac{h}{\tan \alpha_i} + R_{i-1}}{F}\right].$$

In the above formula, h represents a zone height of the equal-height-zone planar Fresnel lens, a zone width of a corresponding zone in the equal-height-zone planar Fresnel lens is $D_i$, and $\alpha_i$ represents an inclination of an i-th zone of multiple zones of the equal-height-zone planar Fresnel lens; when i=1, $R_{i-1}$ in the formula for the equal-height-zone planar Fresnel lens is equal to 0, which corresponds to a first zone of the multiple zones of the equal-height-zone planar Fresnel lens; when i>1, $R_{i-1}$ in the formula for the equal-height-zone planar Fresnel lens is not equal to 0, which corresponds to an outer zone of the multiple zones of the equal-height-zone planar Fresnel lens; and when $R_i \geq R$, R represents the radius of the equal-height-zone planar Fresnel lens, an excess portion exceeding the radius R of the equal-height-zone planar Fresnel lens is removed to complete designing the equal-height-zone planar Fresnel lens.

Step 2: according to an optical path characteristic of the concentrating system, an optical path equation of the concentrating system is established.

Figure 4:
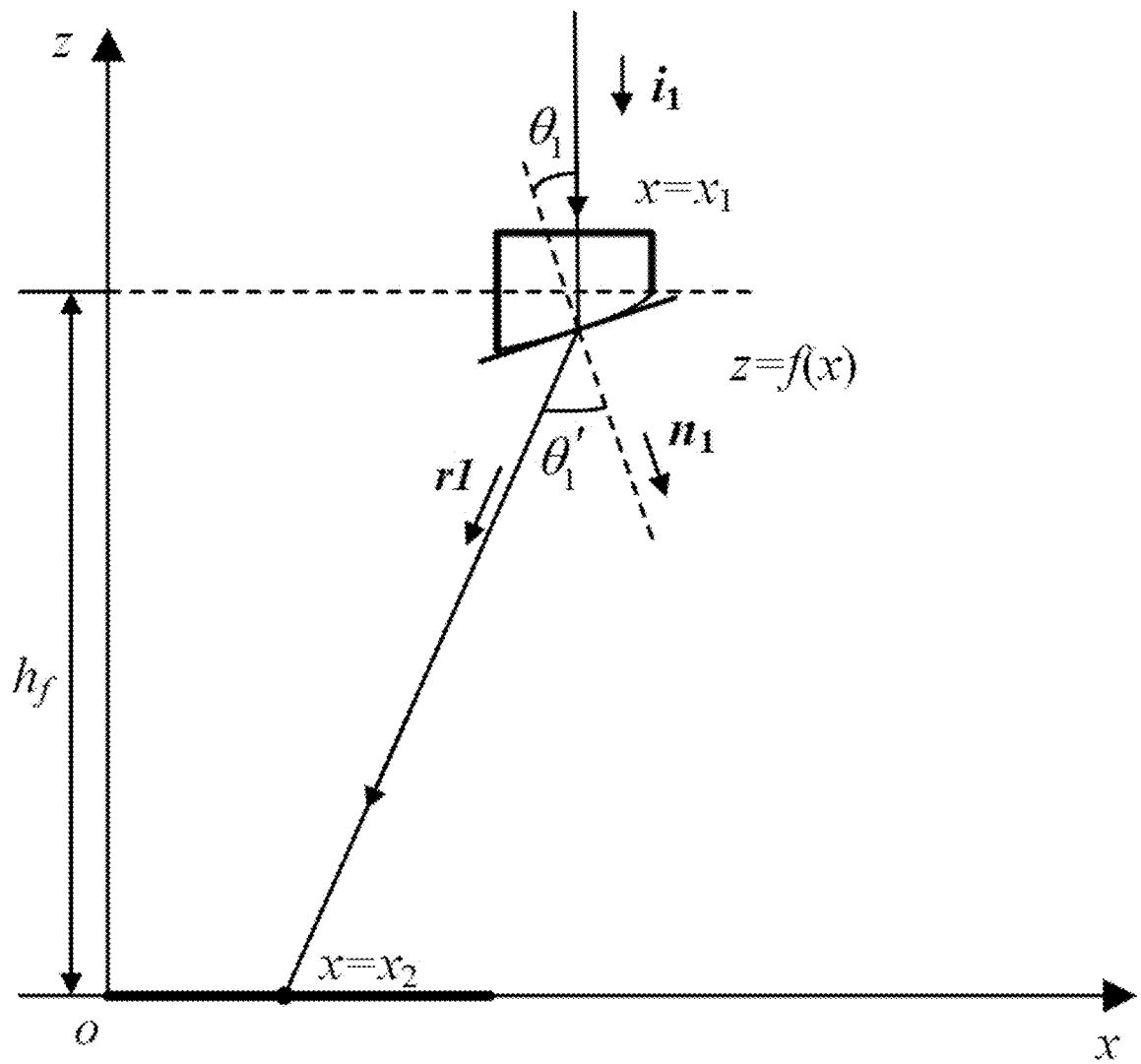
FIG. 4 illustrates a schematic diagram of an optical path of the planar Fresnel lens.

As shown in FIG. 4, it is a schematic diagram of the optical path of the planar Fresnel lens. Specially, an equation of a generatrix of the planar Fresnel lens at a zone of the multiple zones of the planar Fresnel lens is assumed as z=f(x), a range of the zone is [$x_{min}$, $x_{max}$], a distance from a plane to the planar Fresnel lens is $h_f$=f($x_{max}$), an incident light perpendicular to an incident plane of the planar Fresnel lens is irradiated at x=$x_1$, the incident light is refracted at a point ($x_1$, f($x_1$)) to generate a refracted light, an incident angle and a refraction angle of the incident light are respectively $\theta_1$ and $\theta_1'$, a unit vector of the incident light and a unit vector of the refracted light are respectively a vector $i_1$ and a vector r1, a unit vector at an intersection between the incident light and the generatrix of the planar Fresnel lens is $n_1$, and a refractive index of the planar Fresnel lens is n.

Specially, the incident angle of the incident light is determined according to a formula expressed as follows:

$$\theta_1 = \arccos\left(\frac{1}{\sqrt{1+[f'(x_1)]^2}}\right).$$

The refraction angle of the incident light is determined according to a law of refraction, based on a formula expressed as follows:

$$\theta_1' = \arcsin(n \sin \theta_1).$$

A function between an abscissa $x_1$ of the incident light perpendicular to the incident plane of the planar Fresnel lens and an abscissa $x_2$ of an intersection of the refracted light with the plane with the distance $h_f$ from the planar Fresnel lens, is determined as the optical path equation of the concentrating system, according to a formula expressed as follows:

$$x_2 = -\frac{f(x_1)\left(1 + \cos^2\theta_1'\left[1 + f'^2(x_1)\right]\right)}{f'(x_1) - \cos\theta_1'\sin\theta_1'\left[1 + f'^2(x_1)\right]} + x_1.$$

Specially, a center of the planar Fresnel lens is a coordinate zero point, a refracted optical path of the planar Fresnel lens on a negative x-axis is axisymmetric with a refracted optical path of the planar Fresnel lens on a positive x-axis.

Step 3: based on considering the light-homogenized design to derive a distribution function of the luminous energy density, a differential form of uniform distribution of luminous energy density is determined.

Step 3.1: a first differential form of the uniform distribution of the luminous energy density in a two-dimensional case is determined.

Figure 5:
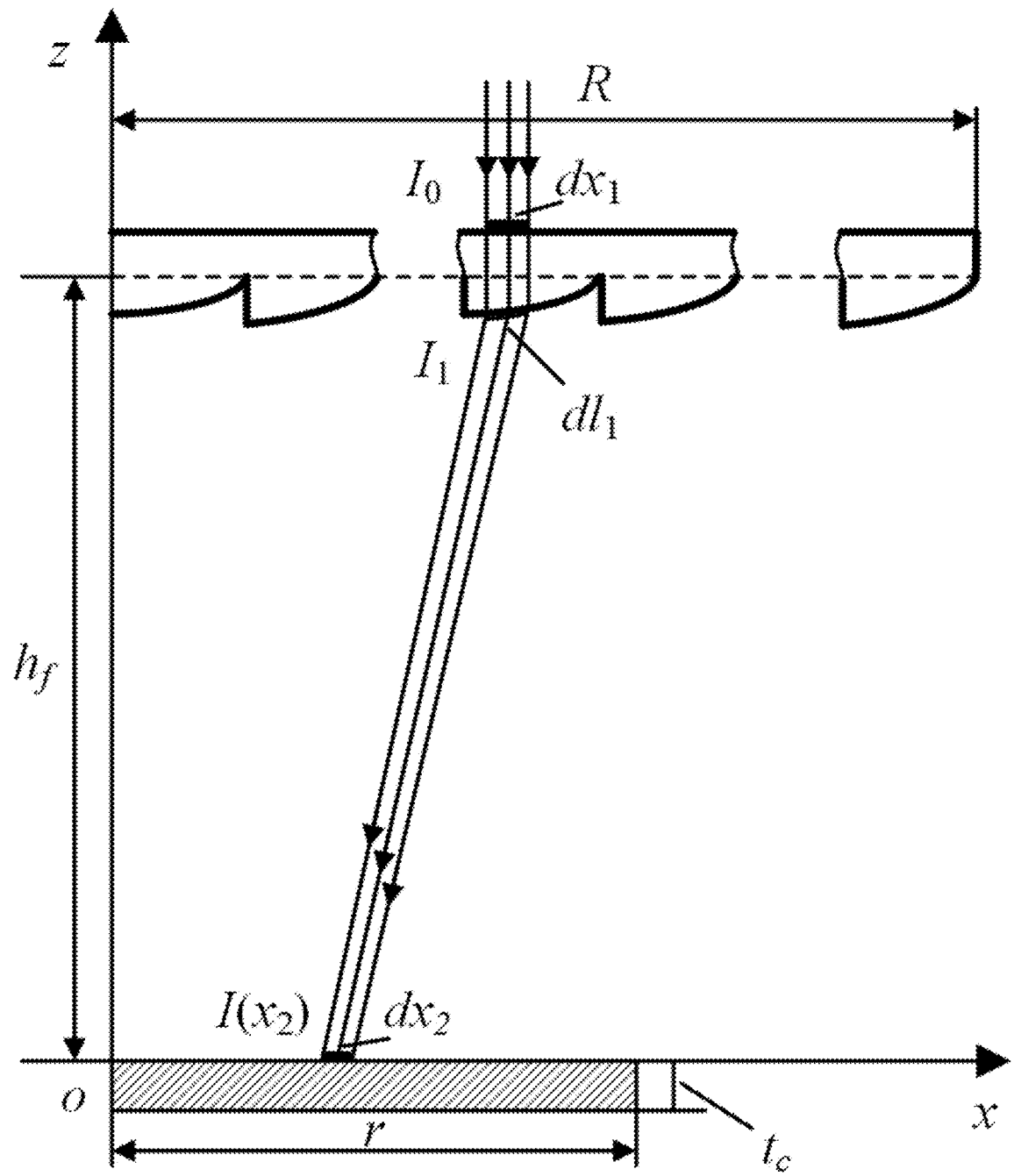
FIG. 5 illustrates a schematic diagram of a coordinate system of a center section of the planar Fresnel lens.

An upper surface of a photovoltaic cell is disposed on a focal plane of the planar Fresnel lens, and differential analysis is performed on a center section of the planar Fresnel lens to establish a coordinate system of the center section of the planar Fresnel lens. Then, the coordinate system of the center section of the planar Fresnel lens is established in FIG. 5, a thickness of the photovoltaic cell is $t_c$, a radius of the photovoltaic cell is r, and an infinitesimal taken from the zone of the multiple zones of the planar Fresnel lens is $dx_1$; a luminous energy density of the incident light perpendicular to the incident plane of the planar Fresnel lens at the infinitesimal $dx_1$ is determined as $I_0$, a curved-surface infinitesimal corresponding to the incident light on the generatrix of the planar Fresnel lens is determined as $dl_1$, a luminous energy density at the curved-surface infinitesimal $dl_1$ is determined as $I_1$, an infinitesimal of the incident light refracted at the upper surface of the photovoltaic cell is determined as $dx_2$, a luminous energy density at the infinitesimal $dx_2$ is determined as $I(x_2)$; and in a situation that a loss of luminous energy caused by the planar Fresnel lens is not considered, a two-dimensional luminous energy density of the upper surface of the photovoltaic cell under concentrating by the zone of the multiple zones of the planar Fresnel lens is determined according to a formula expressed as follows:

$$I(x_2) = \frac{I_0 dx_1}{dx_2} = I_0 \frac{1}{1 + \frac{-k_r f'(x_1) + f(x_1) k_r'}{k_r^2}}.$$

In the above formula, $k_r$ represents a gradient of the refracted light, and $k'_r$ represents a first derivative of the gradient of the refracted light.

Step 3.2: a second differential form of the uniform distribution of the luminous energy density in a three-dimensional case is determined as the differential form of uniform distribution of luminous energy density.

Based on the two-dimensional luminous energy density, the uniform distribution of the luminous energy density in the three-dimensional case is obtained according to a formula expressed as follows:

$$I(x_2) = \frac{I_0 x_1 dx_1}{x_2 dx_2} = I_0 \frac{x_1}{x_2} \frac{1}{1 + \frac{-k_r(x_1)f'(x_1) + f(x_1)k_r'(x_1)}{k_r^2(x_1)}}.$$

Step 4: according to the luminous energy density distribution equation established in the step 3 and the corresponding analysis and research on the luminous energy density distribution, it is found that when the multiple zones of the planar Fresnel lens are uniformly grouped and the light refracted to the focal plane of the planar Fresnel lens by the zones in each group of zones is completely superposed, a uniform light-concentrating effect can be achieved. Moreover, in order to obtain a higher light-concentrating ratio, it is necessary to establish a design function of the multi-zone grouped and light-homogenized Fresnel lens (i.e., calculating design parameters of the multi-zone grouped and light-homogenized Fresnel lens).

Step 4.1: a first group of zones of the planar Fresnel lens is designed under the uniform distribution of the luminous energy density.

Figure 6:
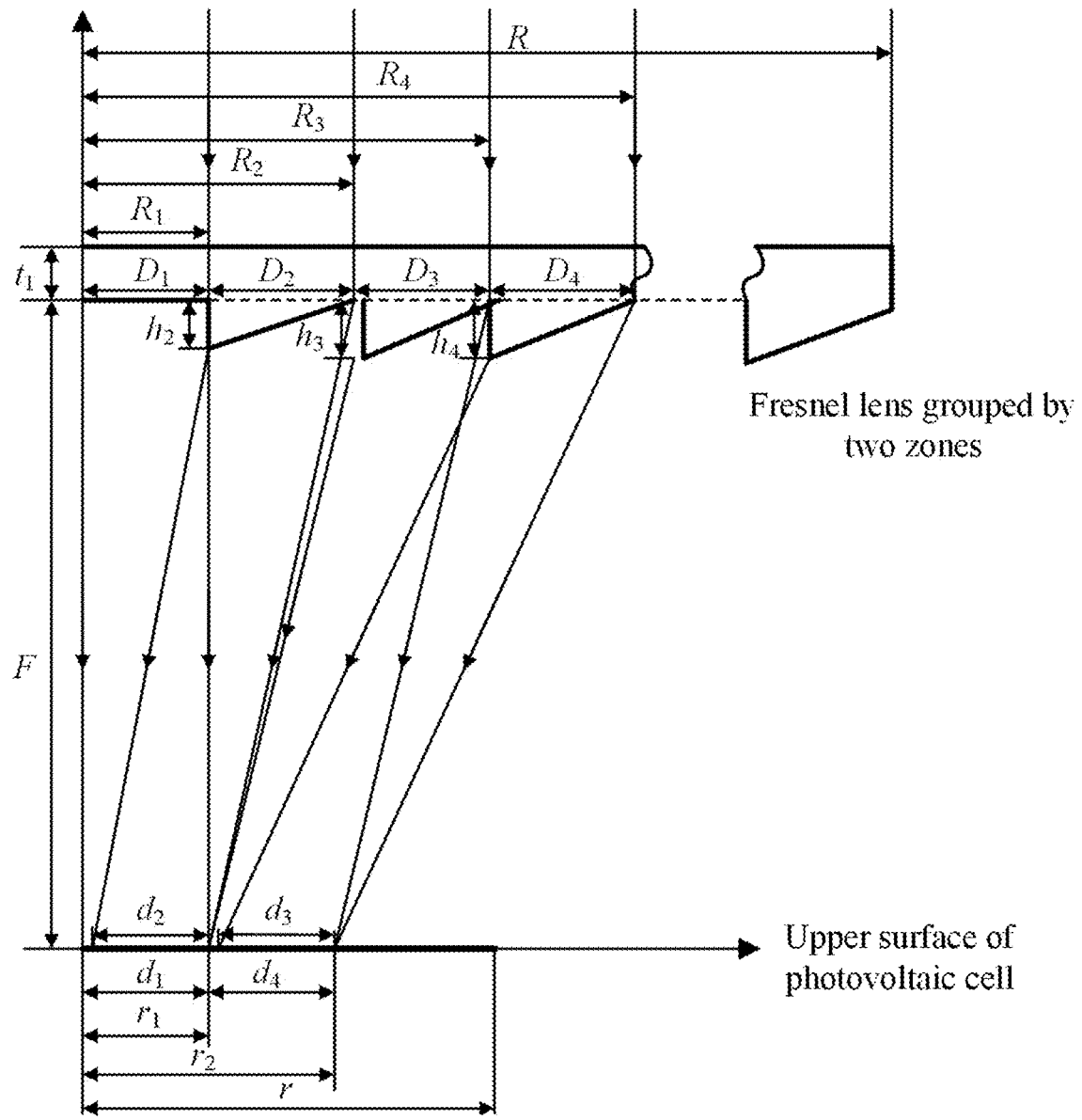
FIG. 6 illustrates a schematic diagram of a light-homogenized design principle of the planar Fresnel lens grouped by two zones.

As shown in FIG. 6, two zones are grouped as the planar Fresnel lens, which is taken as an example. Specially, R represents the radius of the planar Fresnel lens, F represents the focal length of the planar Fresnel lens, cr represents the light-concentrating ratio of the planar Fresnel lens, the refractive index of the planar Fresnel lens is n, and r represents the radius of the photovoltaic cell. The upper surface of the photovoltaic cell is the focal plane of the planar Fresnel lens. It is only necessary to calculate the zone width D and the inclination α of each zone of the planar Fresnel lens, so that the design of the multi-zone grouped and light-homogenized Fresnel lens can be completed.

An area of the infinitesimal of the zone near the central axis of the upper surface of the photovoltaic cell is close to 0, and in order to avoid the peak value of the luminous energy density at the central axis, the generatrix of the first zone is designed as a plane with an inclination of $\alpha_1=0$, and therefore $R_1=r_1=d_1=D_1$.

Particularly, $d_1$ represents a width of a luminous region of the first zone caused by the refracted light on the upper surface of the photovoltaic cell; and $r_1$ represents a radius of the luminous region of the first zone caused by the refracted light on the upper surface of the photovoltaic cell.

Specially, a first zone width of the first zone of the first group of zones is $D_1$; a second zone width of a second zone of the first group of zones is $D_2$; a radius of the first zone of the first group of zones is $R_1$; and a radius of the second zone of the first group of zones is $R_2$.

The second zone width $D_2$ of the second zone of the first group of zones is determined according to a formula expressed as follows:

$$D_2 = R_2 - R_1.$$

An inclination $\alpha_2$ of the second zone of the first group of zones is determined according to a formula as follows:

$$n \sin \alpha_2 = \sin\left[\alpha_2 + \arctan\frac{R_2 - r_1}{F}\right].$$

A width $d_2$ of a luminous region caused by the refracted light on the upper surface of the photovoltaic cell is determined according to a formula expressed as follows:

$$d_2 = D_2 - \frac{R_2 - r_1}{F} D_2 \tan \alpha_2.$$

Based on the step 4.1, the design of the outer zone group is performed, and the design of the second group of zones is taken as an example. The second group of zones includes a third zone and a fourth zone of the planar Fresnel lens.

A third zone width is determined as $D_3 = D_1$, and an inclination of the third zone is determined as follows:

$$n \sin \alpha_3 = \sin\left[\alpha_3 + \arctan \frac{R_3 - r_1 - D_3 + \frac{D_3 \tan \alpha_3 (R_3 - r_1 - D_3)}{F - D_3 \tan \alpha_3}}{F}\right].$$

A width $d_3$ of the luminous region caused by the refracted light on the upper surface of the photovoltaic cell is determined as follows:

$$d_3 = D_3 - \frac{D_3 \tan \alpha_3 (R_3 - r_1 - D_3)}{F - D_3 \tan \alpha_3}.$$

The fourth zone width $D_4$ is determined according to a formula expressed as follows:

$$D_4 = R_4 - R_3.$$

An inclination $\alpha_4$ of the fourth zone is determined according to a formula as follows:

$$n \sin \alpha_4 = \sin\left[\alpha_4 + \arctan \frac{R_4 - r_3}{F}\right].$$

A width $d_4$ of the luminous region caused by the refracted light on the upper surface of the photovoltaic cell is determined as follows:

$$d_4 = D_4 - \frac{R_4 - r_2}{F} D_4 \tan \alpha_4.$$

Step 4.2: multiple groups of zones are designed, and zone inclinations, zone widths, and zone heights of the multiple groups of zones are calculated.

A generatrix equation of the planar Fresnel lens is determined according to a formula expressed as follows:

$$z = f_i(x) = k_i(x - R_i) + h_i, x \in [R_{i-1}, R_i].$$

In the above formula, $k_i$ represents a gradient of an $i^{th}$ zone of the multiple groups of zones, $R_{i-1}$ and $R_i$ represent radii of the $i^{th}$ zone and an $(i-1)^{th}$ zone respectively; and $k_i = \tan \alpha_i$, where $\alpha_i$ represents the inclination of the $i^{th}$ zone of the multiple groups of zones.

A zone number in each group of the multiple groups of zones is m, and a group number of the multiple groups of zones is j, j≥2, and j represents a $j^{th}$ group of zones.

In view of a first zone in the first group of zones of the multiple groups of zones, a zone width of the first zone in the first group of zones is equal to the zone width of the planar Fresnel lens, i.e., $D_1 = D$; a zone inclination of the first zone in the first group of zones is equal to 0, i.e., $\alpha_1 = 0$; and a zone height of the first zone in the first group of zones is expressed as $h_1 = D \tan \alpha_1$.

In view of the other zones in the first group of zones of the multiple groups of zones, a zone width is expresses as follows:

$$D_i = \frac{\sqrt{cr \cdot r_1^2 + R_1^2} - R_1}{m - 1}.$$

A zone inclination of the other zones in the first group of zones is expressed as follows:

$$n \sin \alpha_i = \sin\left[\alpha_i + \arctan \frac{R_i - r_1}{F}\right].$$

A zone height of the other zones in the first group of zones is expressed as follows:

$$h_i = D \tan \alpha_i, i \in [2, m].$$

Moreover, a zone width of a first zone in the $j^{th}$ group of zones is determined according to a formula expressed as follows:

$$D_{mj-m+1} = D.$$

A zone inclination of the first zone in the $j^{th}$ group of zones is determined according to a formula expressed as follows:

$$n \sin \alpha_{mj-m+1} =$$

$$\sin\left[\alpha_{mj-m+1} + \arctan \frac{R_{mj-m+1} - r_{mj-m+1} + D_{mj-m+1} + \frac{D_{mj-m+1}(R_{mj-m+1} - r_{mj-2m+1} + D_{mj-m+1})}{F - D_{mj-m+1} \tan \alpha_{mj-m+1}}}{F}\right].$$

A zone height of the first zone in the $j^{th}$ group of zones is determined according to a formula expressed as follows:

$$h_i = D \tan \alpha_i.$$

In view of the other zones in the $j^{th}$ group of zones, a zone width of the $i^{th}$ zone in the $j^{th}$ group of zones is determined according to a formula expressed as follows:

$$D_{mj-m+i} = \frac{\sqrt{cr \cdot (r_{mj-m+1}^2 - r_{mj-2m+1}^2) + R_{mj}^2} - R_{mj-m+1}}{m - 1}.$$

A zone inclination of the $i^{th}$ zone in the $j^{th}$ group of zones is determined according to a formula expressed as follows:

$$n \sin \alpha_{mj-m+i} = \sin\left[\alpha_{mj-m+i} + \arctan\frac{R_{mj-m+i} - r_{mj-m+i}}{F}\right].$$

A zone height of the $i^{th}$ zone in the $j^{th}$ group of zones is determined according to a formula expressed as follows:

$$h_i = D \tan \alpha_i, i \in [2,m].$$

Step 4.3: a height error of each zone of the planar Fresnel lens is calculated, and a zone height of each zone of the planar Fresnel lens is calculated after the height error is added.

Figure 7:
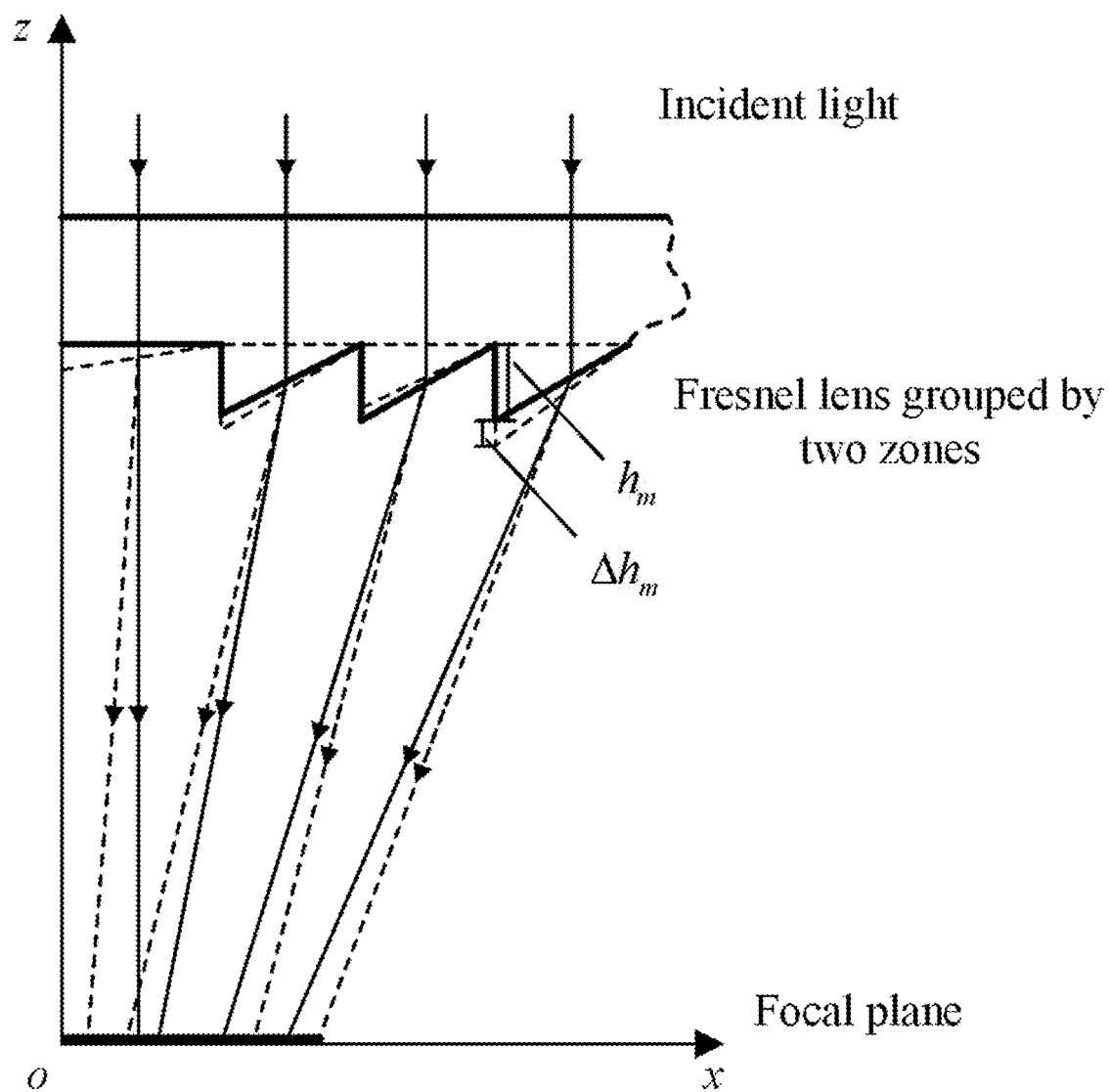
FIG. 7 illustrates a schematic diagram of an influence of a height error of a zone on a refracted optical path.

As shown in FIG. 7, the height error $\Delta h_m$ is added to the zone height $h_m$ of the planar Fresnel lens grouped by the two zones, thereby influencing the optical path of the refracted light, and a theoretical calculation is performed on the zone height $h_m$ of the group of zones of the planar Fresnel lens, where m represents a $m^{th}$ zone of the group of zones of the planar Fresnel lens and the z height error $\Delta h_m$ satisfied with a normal distribution is expressed according to the following formula:

$$\Delta h_m = \frac{1}{\sqrt{2\pi}} \exp\left(-\frac{(X-\mu)^2}{2\sigma^2}\right).$$

The zone height $h_m$ of the group of zones of the planar Fresnel lens is obtained as follows:

$$h'_m = h_m - \Delta h_m.$$

For the straightness error at the refraction point of the incident light, the straightness error analysis of the generatrix is performed.

Figure 8:
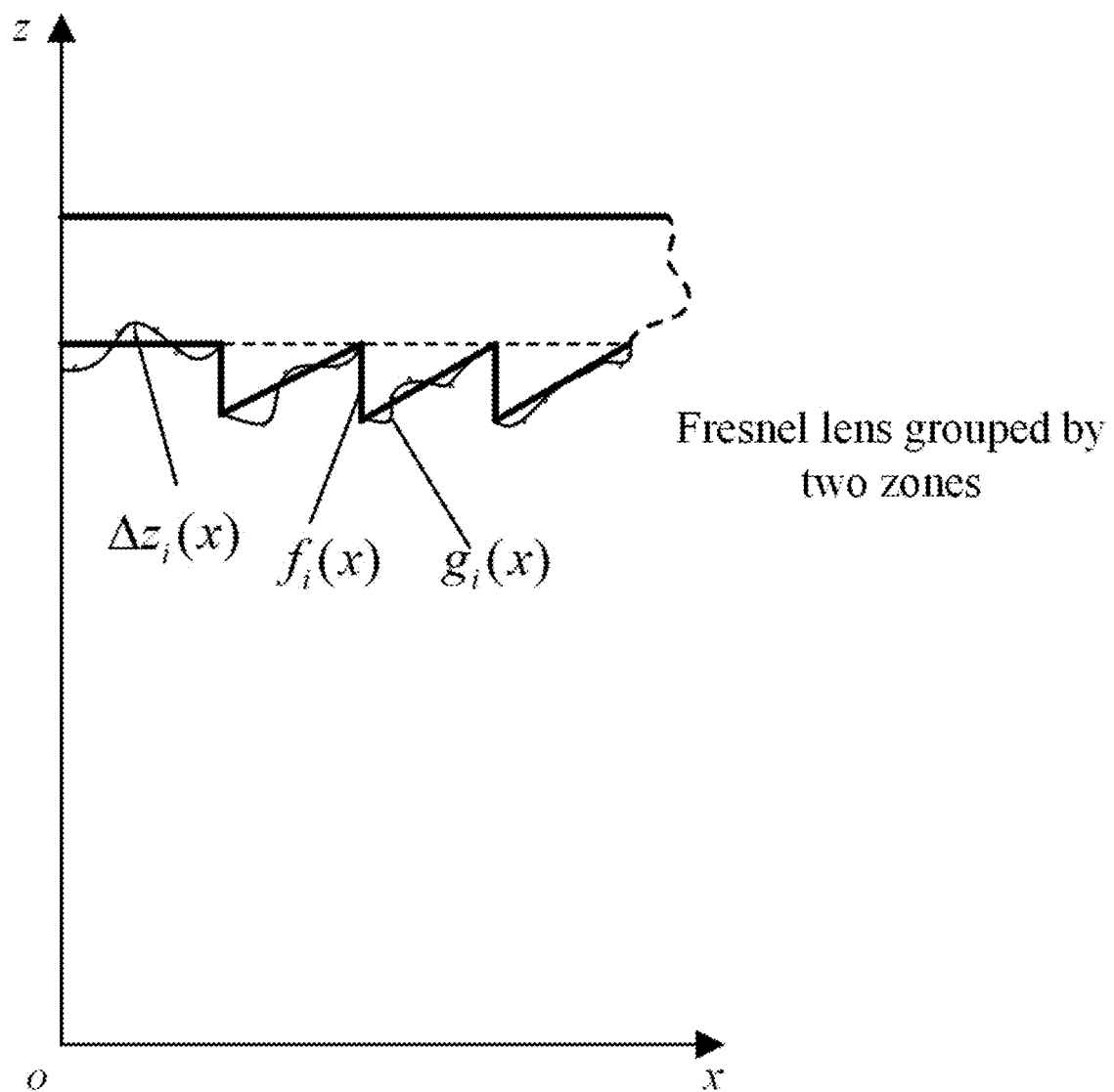
FIG. 8 illustrates a schematic diagram of a straightness error of a generatrix of the zone.

FIG. 8 illustrates a schematic diagram of adding the straightness error to the generatrix of the planar Fresnel lens grouped by two zones, a theoretical generatrix equation of the zone is expressed as $z = f_i(x)$, where i represents the $i^{th}$ zone. Moreover, a normal distribution random error point $\Delta zi(x)$ is generated on each generatrix corresponding to the zone, and an expression function gi(x) of the error of the generatrix of each zone is obtained by fitting the normal distribution random error point $\Delta zi(x)$.

The generatrix of the planar Fresnel lens added with the straightness error is as follows:

$$z' = f'_i(x) = f_i(x) + g_i(x).$$

The normal distribution random error point $\Delta zi(x)$ is expressed as follows:

$$\Delta zi(x) = \frac{1}{\sqrt{2\pi}\sigma} \exp\left(-\frac{(X-\mu)^2}{2\sigma^2}\right).$$

It can be seen from the above analysis that for the vertical incident light, the light condensation characteristic of the light-homogenized Fresnel lens depends on the inclination of the generatrix of the planar Fresnel lens. Due to the existence of the height error, the actual heights and widths of the zones may deviate from the design value, so that the inclination of the generatrix of the planar Fresnel lens deviates from the design value, and since the zone height is smaller than the zone width, the influence of the height error of the zone on the inclination of the zone is larger. In addition, due to the existence of the height error, the actual generatrix of the planar Fresnel lens is not an ideal straight line, but fluctuates within an error range, which may cause the incident angle of the incident light to change, thereby affecting the concentrating characteristic of the planar Fresnel lens. Therefore, the straightness error needs to be added to perform energy characteristic analysis under the action of the height error.

The design method of the multi-zone grouped and light-homogenized Fresnel lens for the concentrating system provided by the present disclosure is further optimized by the simulation test. Moreover, an optimal number of zones is obtained according to different light-concentrating ratio design requirements.

1. Simulation Parameters

The relevant parameters of the given planar Fresnel lens are as follows. The focal length F of the planar Fresnel lens is 1,400 milliliters (mm), the radius R of the planar Fresnel lens is 500 mm, a wavelength of the planar Fresnel lens is 615 nm, the planar Fresnel lens is made of polymethyl methacrylate (PMMA) with the refractive index n of 1.49063, and the set zone width $D_1$ (also referred to the first zone width of the group of zones) is 3 mm.

2. Simulation Test and Simulation Results

Figure 9:
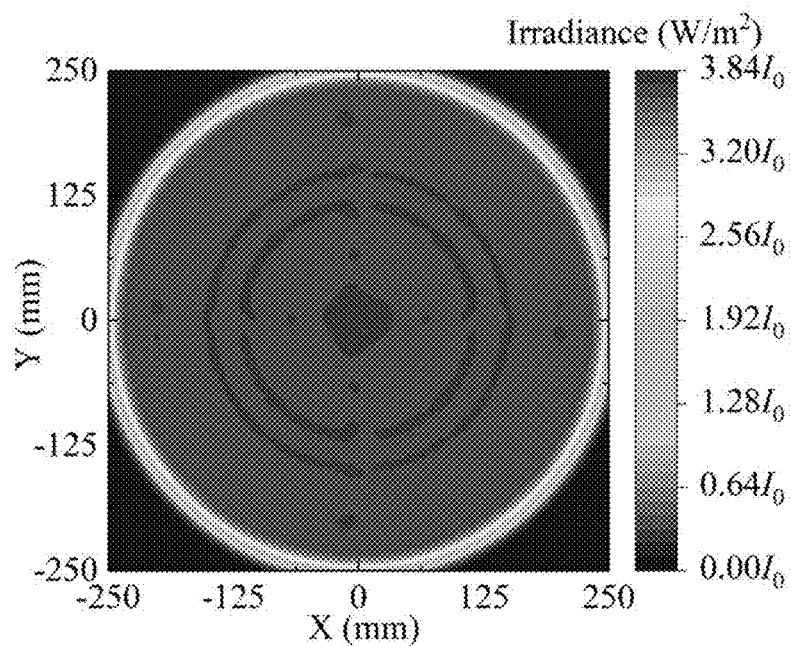
FIG. 9 illustrates an irradiation distribution diagram of a focal plane of the planar Fresnel lens grouped by two zones.
Figure 10:
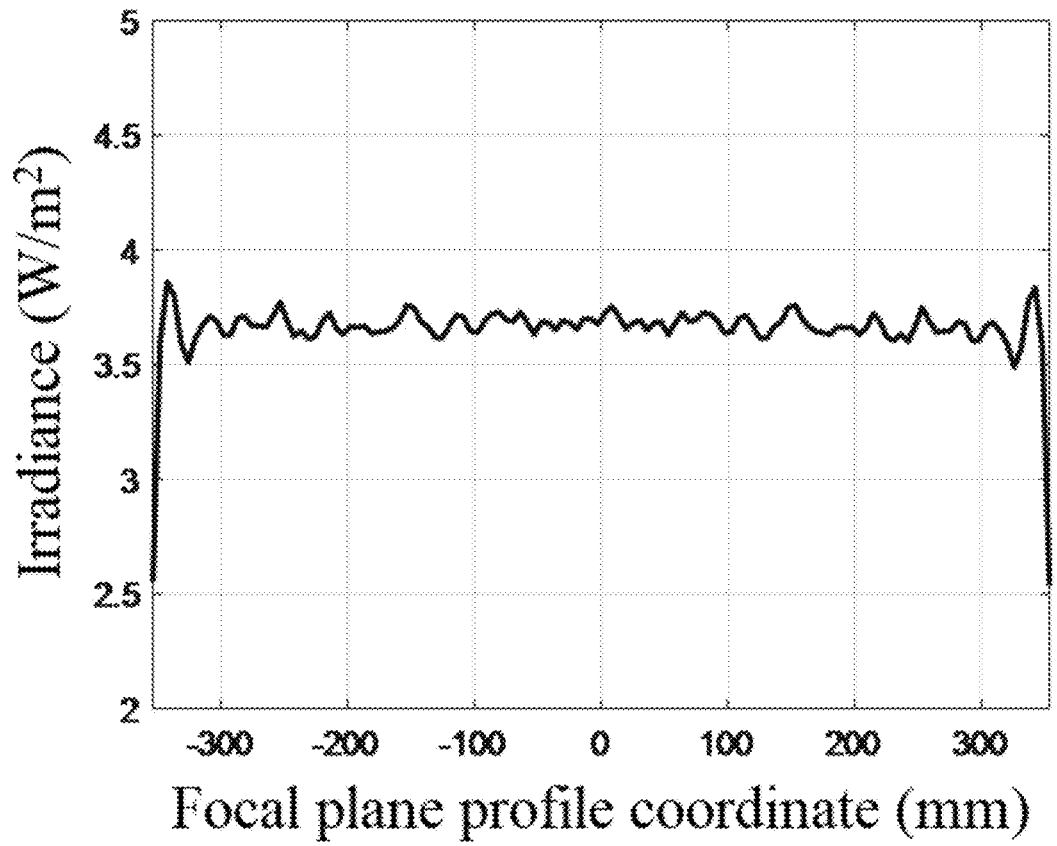
FIG. 10 illustrates an irradiation distribution diagram of a focal plane profile of the planar Fresnel lens grouped by two zones according to an embodiment 1 of the present disclosure.
Figure 11:
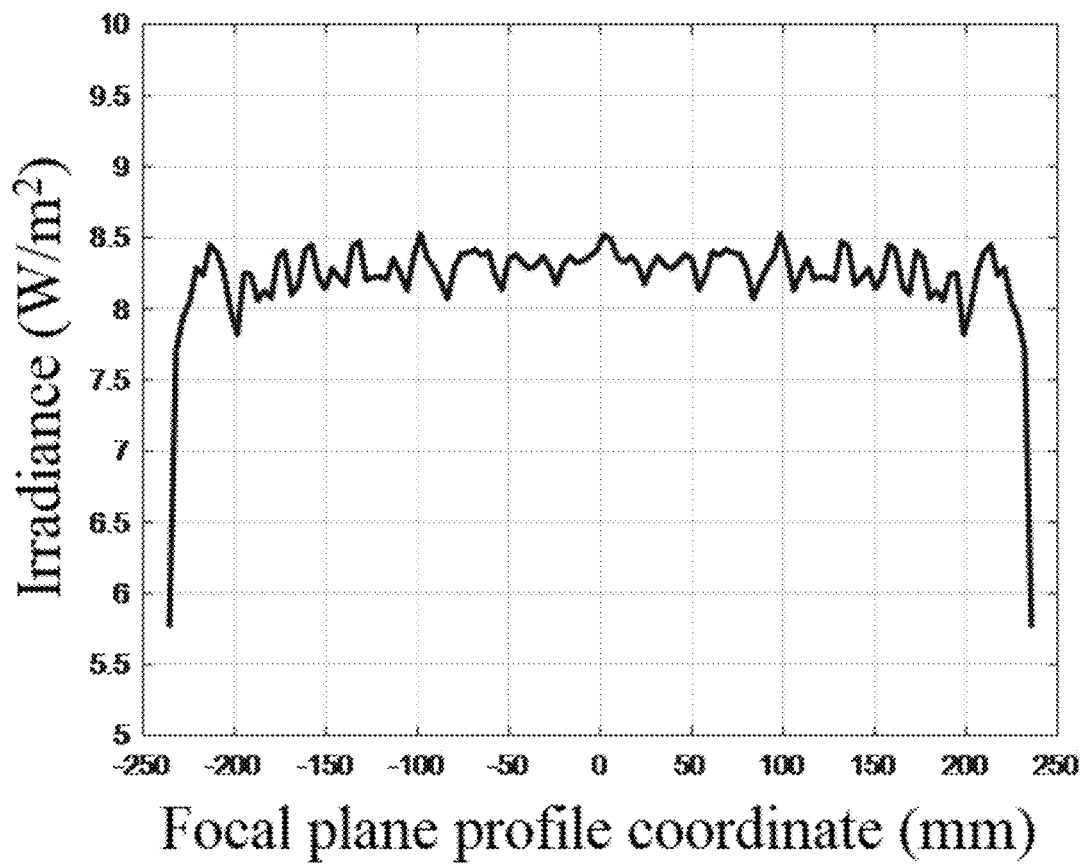
FIG. 11 illustrates an irradiance distribution map of a focal plane profile of a planar Fresnel lens grouped by three zones according to an embodiment 2 of the present disclosure.
Figure 12:
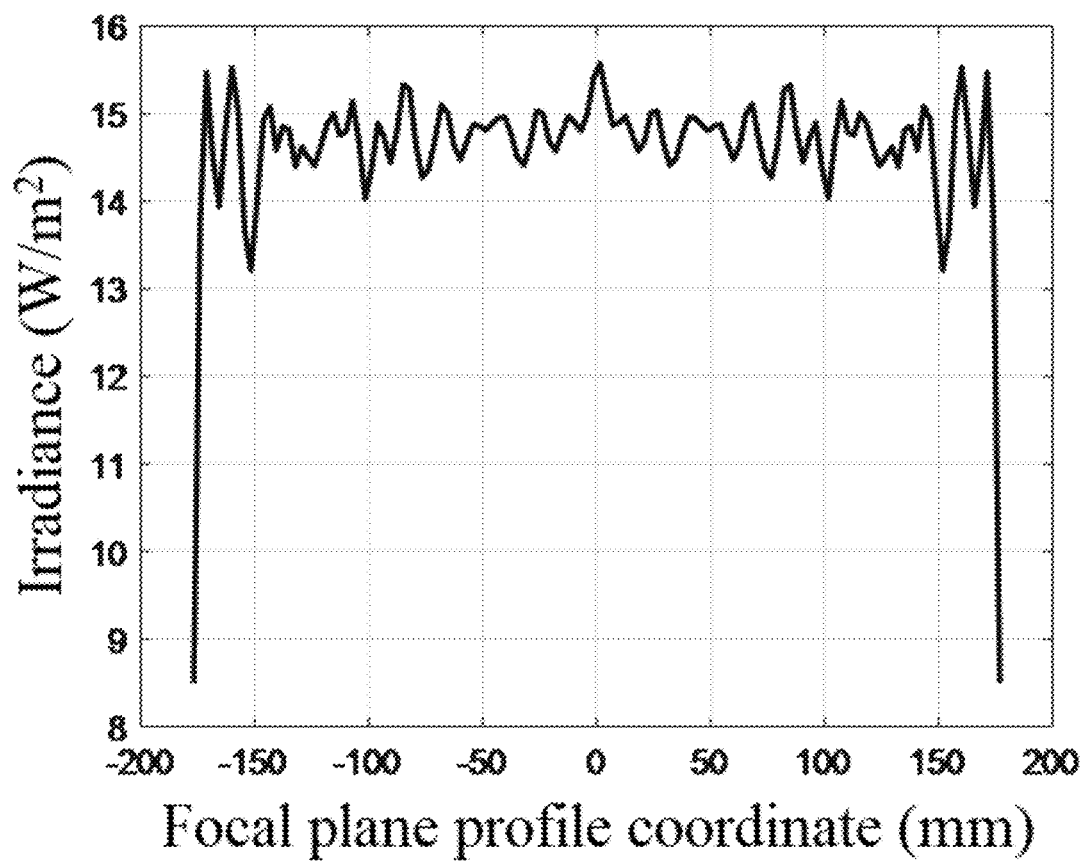
FIG. 12 illustrates an irradiance distribution map of a focal plane profile of a planar Fresnel lens grouped by four zones according to an embodiment 3 of the present disclosure.
Figure 13:
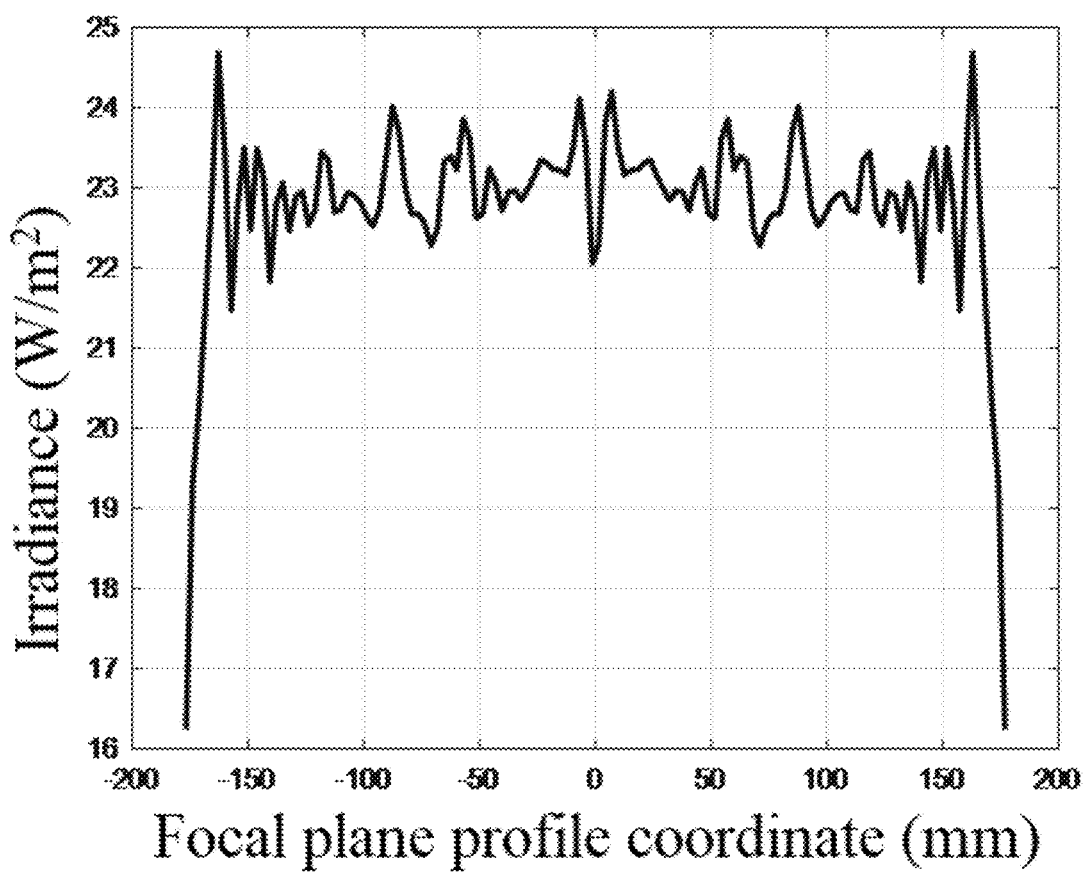
FIG. 13 illustrates an irradiance distribution map of a focal plane profile of a planar Fresnel lens grouped by five zones according to an embodiment 4 of the present disclosure.

Table 1 shows the design parameters of the planar Fresnel lens grouped by different groups of zones, and the light-concentrating efficiency and the focal plane irradiance uniformity are obtained through simulation calculation. FIG. 9 shows an irradiation distribution diagram of a focal plane of the planar Fresnel lens grouped by two zones under a 4-fold light-concentrating ratio, and FIG. 10, FIG. 11, FIG. 12, and FIG. 13 respectively provide a focal plane profile irradiance distribution diagram under the planar Fresnel lens grouped by two zones, three zones, four zones, and zones.

TABLE 1

| Embodiment | Design method | Lens radius (mm) | Focal length (mm) | Zone width (mm) | Distribution range of zone height (mm) | Refractive index | Light-concentrating ratio | Light-concentrating efficiency | Uniformity of luminous energy distribution |
|---|---|---|---|---|---|---|---|---|---|
| Embodiment 1 | Grouped by two zones | 500 | 1400 | 3 | 0.013~1.041 | 1.49063 | 4 | 91.9% | 97.2% |
| Embodiment 2 | Grouped by three zones | 500 | 1400 | 3 | 0.013~1.330 | 1.49063 | 9 | 91.3% | 94.8% |
| Embodiment 3 | Grouped by four zones | 500 | 1400 | 3 | 0.013~1.464 | 1.49063 | 16 | 91.5% | 90.7% |
| Embodiment 4 | Grouped by five zones | 500 | 1400 | 3 | 0.013~1.554 | 1.49063 | 25 | 90.9% | 88.4% |

It can be seen from the data in Table 1 that the light-concentrating ratios of the multi-zone grouped Fresnel lenses are 4, 9, 16 and 25, respectively, so as to realize the low-power concentrating design of the Fresnel lens under the four different light-concentrating ratios. Moreover, the light-concentrating efficiency under the four different light-concentrating ratios is distributed between 90% and 92%, and the luminous energy of the Fresnel concentrating system is efficiently collected. In addition, the distribution uniformity of the focal plane luminous energy distribution is between 88% and 97%, so that the high light-homogenized design of the Fresnel lens under different concentrating ratios is achieved.

The above data illustrates the design method of the multi-zone grouped and light-homogenized Fresnel lens for the concentrating system. Moreover, the low-power concentrating design of the Fresnel lens is performed, so that the problem of excessive luminous energy concentration caused by high-power concentrating is avoided, and efficient collection and high-uniformity distribution of luminous energy under different light-concentrating ratios are effectively achieved.

What is claimed is:

1. A design method of a multi-zone grouped and light-homogenized Fresnel lens for a concentrating system, comprising the following steps:

step 1, designing, according to a basic principle of a Fresnel lens, a planar Fresnel lens, wherein the step 1 comprises the following steps:

designing, according to widths of a plurality of zones of the planar Fresnel lens, the planar Fresnel lens comprising an equal-width-zone planar Fresnel lens and an equal-height-zone planar Fresnel lens, comprising:

designing the equal-width-zone planar Fresnel lens according to a formula expressed as follows:

$$n \sin \alpha_i = \sin\left[\alpha_i + \arctan\frac{i \cdot D}{F}\right];$$

wherein D represents a zone width of the equal-width-zone planar Fresnel lens, F represents a focal length of the equal-width-zone planar Fresnel lens, n represents a refractive index of the equal-width-zone planar Fresnel lens, and $\alpha_i$ represents an inclination of an i-th zone of a plurality of zones of the equal-width-zone planar Fresnel lens; and generatrices of the equal-width-zone planar Fresnel lens are obtained according to the inclinations of the plurality of zones of the equal-width-zone planar Fresnel lens; and designing the equal-height-zone planar Fresnel lens according to a formula expressed as follows:

$$n \sin \alpha_i = \sin\left[\alpha_i + \arctan\frac{\frac{h}{\tan \alpha_i} + R_{i-1}}{F}\right];$$

wherein h represents a zone height of the equal-height-zone planar Fresnel lens, and $\alpha_i$ represents an inclination of an i-th zone of a plurality of zones of the equal-height-zone planar Fresnel lens; when i=1, $R_{i-1}$ in the formula for the equal-height-zone planar Fresnel lens is equal to 0, which corresponds to a first zone of the plurality of zones of the equal-height-zone planar Fresnel lens; when i>1, $R_{i-1}$ in the formula for the equal-height-zone planar Fresnel lens is not equal to 0, which corresponds to an outer zone of the plurality of zones of the equal-height-zone planar Fresnel lens; and when $R_i \geq R$, R represents a radius of the equal-height-zone planar Fresnel lens, an excess portion exceeding the radius R of the equal-height-zone planar Fresnel lens is removed to complete designing the equal-height-zone planar Fresnel lens;

step 2, establishing, according to an optical path characteristic of the concentrating system, an optical path equation of the concentrating system, wherein the step 2 comprises the following steps:

assuming that: an equation of a generatrix of the planar Fresnel lens at a zone of the plurality of zones of the planar Fresnel lens is z=f(x), a range of the zone is [$x_{min}$, $x_{max}$], a distance from a plane to the planar Fresnel lens is $h_f$=f($x_{max}$), an incident light perpendicular to an incident plane of the planar Fresnel lens is irradiated at x=$x_1$, the incident light is refracted at a point ($x_1$, f($x_1$)) to generate a refracted light, an incident angle and a refraction angle of the incident light are respectively $\theta_1$ and $\theta_1'$, a unit vector of the incident light and a unit vector of the refracted light are respectively a vector $i_1$ and a vector r1, a unit vector at an intersection between the incident light and the generatrix of the planar Fresnel lens is $n_1$, and a refractive index of the planar Fresnel lens is n;

determining the incident angle of the incident light according to a formula expressed as follows:

$$\theta_1 = \arccos\left(\frac{1}{\sqrt{1 + [f'(x_1)]^2}}\right);$$

determining the refraction angle of the incident light according to a law of refraction, based on a formula expressed as follows:

$\theta_1'$=arcsin($n$ sin $\theta_1$);

determining a function between an abscissa $x_1$ of the incident light perpendicular to the incident plane of the planar Fresnel lens and an abscissa $x_2$ of an intersection of the refracted light with the plane with the distance $h_f$ from the planar Fresnel lens, as the optical path equation of the concentrating system, according to a formula expressed as follows:

$$x_2 = -\frac{f(x_1)\left(1 + \cos^2\theta_1'\left[1 + f'^2(x_1)\right]\right)}{f'(x_1) - \cos\theta_1'\sin\theta_1'\left[1 + f'^2(x_1)\right]} + x_1;$$

wherein a center of the planar Fresnel lens is a coordinate zero point, a refracted optical path of the planar Fresnel lens on a negative x-axis is axisymmetric with a refracted optical path of the planar Fresnel lens on a positive x-axis;

step 3, determining a differential form of uniform distribution of luminous energy density, wherein the step 3 comprises the following steps:

step 3.1, determining a first differential form of the uniform distribution of the luminous energy density in a two-dimensional case, wherein the step 3.1 comprises the following steps:

determining that an upper surface of a photovoltaic cell is disposed on a focal plane of the planar Fresnel lens, performing differential analysis on a center section of the planar Fresnel lens to establish a coordinate system of the center section of the planar Fresnel lens, wherein a thickness of the photovoltaic cell is $t_c$, a radius of the photovoltaic cell is r, and an infinitesimal taken from the zone of the plurality of zones of the planar Fresnel lens is $dx_1$;

determining a luminous energy density of the incident light perpendicular to the incident plane of the planar Fresnel lens at the infinitesimal $dx_1$ as $I_0$, determining a curved-surface infinitesimal corresponding to the incident light on the generatrix of the planar Fresnel lens as $dl_1$, determining a luminous energy density at the curved-surface infinitesimal $dl_i$ as $I_1$, determining an infinitesimal of the incident light refracted at the upper surface of the photovoltaic cell as $dx_2$, determining a luminous energy density at the infinitesimal $dx_2$ as $I(x_2)$; and in a situation that a loss of luminous energy caused by the planar Fresnel lens is not considered, determining a two-dimensional luminous energy density of the upper surface of the photovoltaic cell under concentrating by the zone of the plurality of zones of the planar Fresnel lens according to a formula expressed as follows:

$$I(x_2) = \frac{I_0 dx_1}{dx_2} = I_0 \frac{1}{1 + \frac{-k_r f'(x_1) + f(x_1) k_r'}{k_r^2}};$$

wherein $k_r$ represents a gradient of the refracted light, and $k_r'$ represents a first derivative of the gradient of the refracted light; and step 3.2, determining a second differential form of the uniform distribution of the luminous energy density in a three-dimensional case, as the differential form of uniform distribution of luminous energy density, wherein the step 3.2 comprises the following steps:

obtaining, based on the two-dimensional luminous energy density, the uniform distribution of the luminous energy density in the three-dimensional case according to a formula expressed as follows:

$$I(x_2) = \frac{I_0 x_1 dx_1}{x_2 dx_2} = I_0 \frac{x_1}{x_2} \frac{1}{1 + \frac{-k_r(x_1) f'(x_1) + f(x_1) k_r'(x_1)}{k_r^2(x_1)}};$$

step 4, based on the step 3, calculating design parameters of the multi-zone grouped and light-homogenized Fresnel lens to obtain the multi-zone grouped and light homogenized Fresnel lens, wherein the step 4 comprises the following steps:

step 4.1, designing a first group of zones of the planar Fresnel lens under the uniform distribution of the luminous energy density, which specifically comprises:

designing a generatrix of a first zone of the first group of zones as a plane with an inclination $\alpha_1 = 0$, and determining $R_1 = r_1 = d_1 = D_1$;

wherein a first zone width of the first zone of the first group of zones is $D_1$; a second zone width of a second zone of the first group of zones is $D_2$; a radius of the first zone of the first group of zones is $R_1$; a radius of the second zone of the first group of zones is $R_2$; $d_1$ represents a width of a luminous region of the first zone caused by the refracted light on the upper surface of the photovoltaic cell; and $r_1$ represents a radius of the luminous region of the first zone caused by the refracted light on the upper surface of the photovoltaic cell;

determining the second zone width $D_2$ of the second zone of the first group of zones according to a formula expressed as follows:

$$D_2 = R_2 - R_1;$$

determining an inclination $\alpha_2$ of the second zone of the first group of zones according to a formula as follows:

$$n \sin \alpha_2 = \sin\left[\alpha_2 + \arctan \frac{R_2 - r_1}{F}\right];$$

determining a width $d_2$ of a luminous region of the second zone caused by the refracted light on the upper surface of the photovoltaic cell according to a formula expressed as follows:

$$d_2 = D_2 - \frac{R_2 - r_1}{F} D_2 \tan \alpha_2;$$

step 4.2, designing multiple groups of zones, and calculating zone inclinations, zone widths, and zone heights of the multiple groups of zones, wherein the step 4.2 comprises the following steps:

determining a generatrix equation of the planar Fresnel lens according to a formula expressed as follows:

$$z = f_i(x) = k_i(x - R_i) + h_{ji}, x \in [R_{i-1}, R_i];$$

wherein $k_i$ represents a gradient of an $i^{th}$ zone of the multiple groups of zones, $R_{i-1}$ and $R_1$ represent radii of the $i^{th}$ zone and an $(i-1)^{th}$ zone respectively; and $k_i = \tan aj$, where $\alpha_1$ represents the inclination of the $i^{th}$ zone of the multiple groups of zones;

wherein a zone number in each group of the multiple groups of zones is m, and a group number of the multiple groups of zones is j, j≥2, j represents a $j^{th}$ group of zones;

determining the design parameters of a first zone in the $j^{th}$ group of zones of the multiple groups of zones, comprising:

determining a zone width of the first zone in the $j^{th}$ group of zones according to a formula expressed as follows:

$$D_{mj-m+1} = D;$$

determining a zone inclination of the first zone in the $j^{th}$ group of zones according to a formula expressed as follows:

$$n\sin\alpha_{mj-m+1} = \sin\left[\alpha_{mj-m+1} + \arctan\frac{R_{mj-m+1} - r_{mj-m+1} + D_{mj-m+1} + \dfrac{D_{mj-m+1}(R_{mj-m+1} - r_{mj-2m+1} + D_{mj-m+1})}{F - D_{mj-m+1}\tan\alpha_{mj-m+1}}}{F}\right];$$

determining a zone height of the first zone in the $j^{th}$ group of zones according to a formula expressed as follows:

$$h_i = D\tan\alpha_i;$$

determining the design parameters of an $i^{th}$ zone in the $j^{th}$ group of zones of the multiple groups of zones, comprising:
determining a zone width of the $i^{th}$ zone in the $j^{th}$ group of zones according to a formula expressed as follows:

$$D_{mj-m+i} = \frac{\sqrt{cr\cdot(r_{mj-m+1}^2 - r_{mj-2m+1}^2) + R_{mj}^2} - R_{mj-m+1}}{m-1};$$

determining a zone inclination of the $i^{th}$ zone in the $j^{th}$ group of zones according to a formula expressed as follows:

$$n\sin\alpha_{mj-m+i} = \sin\left[\alpha_{mj-m+i} + \arctan\frac{R_{mj-m+i} - r_{mj-m+i}}{F}\right];$$

determining a zone height of the $i^{th}$ zone in the $j^{th}$ group of zones according to a formula expressed as follows:

$$h_i = D\tan\alpha_i, i\in[2,m];$$

step 4.3, calculating a height error of each zone of the planar Fresnel lens, and calculating a zone height of each zone of the planar Fresnel lens after the height error is added, wherein the step 4.3 comprises the following steps:

performing a theoretical calculation on a zone height $h_m$ of a group of zones of the planar Fresnel lens after the zone height $h_m$ of the group of zones of the planar Fresnel lens is added with the height error $\Delta h_m$ of the group of zones of the planar Fresnel lens, wherein m represents a $m^{th}$ zone of the group of zones of the planar Fresnel lens, and the zone height $h_m$ of the group of zones of the planar Fresnel lens satisfied with a normal distribution is added according to the following formula:

$$\Delta h_m = \frac{1}{\sqrt{2\pi}}\exp\left(-\frac{(X-\mu)^2}{2\sigma^2}\right);$$

wherein the zone height $h_m$ of the group of zones of the planar Fresnel lens is obtained as follows:

$$h'_m = h_m - \Delta h_m$$

step 4.4, obtaining the designed multi-zone grouped and light-homogenized Fresnel lens according to the design parameters of the planar Fresnel lens obtained in the step 4.1 to the step 4.3, wherein the design parameters comprise: the zone widths, the zone heights, and the zone inclinations.

\* \* \* \* \*